United States Patent [19]

Levin et al.

[11] 4,343,772

[45] Aug. 10, 1982

[54] THERMAL REACTOR

[76] Inventors: Robert A. Frosch, Administrator of the National Aeronautics and Space Administation, with respect to an invention of Harry Levin, Woodland Hills; Larry B. Ford, Pasadena, both of Calif.

[21] Appl. No.: 126,063

[22] Filed: Feb. 29, 1980

[51] Int. Cl.³ .............................................. C22B 26/00
[52] U.S. Cl. .................................. 422/200; 422/202; 422/224; 55/204
[58] Field of Search ............... 422/198, 200, 202, 224, 422/230; 55/204, 201, 459 C, 459 B; 423/349

[56] References Cited

U.S. PATENT DOCUMENTS

| | | | |
|---|---|---|---|
| 1,402,784 | 1/1922 | Moore | 55/459 B |
| 2,697,031 | 12/1954 | Hervert | 422/224 |
| 2,849,930 | 9/1958 | Freeman et al. | 55/201 |
| 3,057,690 | 10/1962 | Reaschel et al. | 422/198 |
| 3,099,523 | 7/1963 | Reaschel | 156/613 |
| 3,694,168 | 9/1972 | Hilgers et al. | 422/200 |
| 3,766,661 | 10/1973 | Bayens et al. | 422/198 |
| 4,059,415 | 11/1977 | Kosaka et al. | 422/224 |
| 4,123,229 | 10/1978 | Carman | 422/202 |
| 4,162,291 | 7/1979 | Arcella et al. | 422/198 |

FOREIGN PATENT DOCUMENTS 55-18233   2/1980   Japan .................................... 55/204

*Primary Examiner*—Hiram Bernstein
*Attorney, Agent, or Firm*—Paul F. McCaul; John R. Manning

[57] ABSTRACT

A thermal reactor apparatus and method of pyrolyticaly decomposing silane gas into liquid silicon product and hydrogen by-product gas is disclosed. The thermal reactor (1) has a reaction chamber (21) which is heated well above the decomposition temperature of silane. An injecter probe (100) introduces the silane gas tangentially into the reaction chamber (21) to form a first, outer, forwardly moving vortex (22) containing the liquid silicon product and a second, inner, rearwardly moving vortex (23) containing the by-product hydrogen gas. The liquid silicon in the first outer vortex (22) deposits onto the interior walls (28) of the reaction chamber (21) to form an equilibrium skull layer (26) which flows to the forward or bottom end of the reaction chamber where it is removed. The by-product hydrogen gas in the second inner vortex (23) is removed from the top or rear of the reaction chamber by a vortex finder (30).

The injecter probe (100) which introduces the silane gas into the reaction chamber (21) is continually cooled by a cooling jacket (110) having water circulating therethrough to keep the temperature of the silane gas well below its decomposition temperature prior to being introduced into the reaction zone.

14 Claims, 5 Drawing Figures

THERMAL REACTOR

ORIGIN OF THE INVENTION

The invention described herein was made in the performance of work under a NASA contract and is subject to the provisions of Sections 305 of the National Aeronautics and Space Act of 1958, public law 83-568 (72 Statute 435; 42 U.S.C. 2454).

BACKGROUND OF THE INVENTION

1. Field of the Invention

The present invention relates to a high temperature thermal reactor utilized in thermal decomposition of precursor gases to liquid products and byproducts gases, and more particularly to the thermal decomposition of silane into silicon products and byproduct hydrogen gas.

2. Description of the Prior Art

There is currently a major effort to develop low cost solar arrays. A primary need is the rapid, high capacity production of good quality silicon at a competitive cost. Present state-of-the-art manufacturing processes for producing high purity silicon are generally carried out by high temperature reduction of trichlorosilane by hydrogen.

The trichlorosilane process requires two reactants and is designed for ingot production. For this prior process involving thermal decomposition of trichlorosilane, the silicon is collected by a deposition on heated electrodes, rods or other surfaces. Production rates are normally in the order of 10 grams per hour. The solid silicon produced by such a process is generally cast into solid shapes for later processing according to methods well-known to the prior art such as the Czochralski continuous liquid feed growth. This two-step process results in unnecessary handling and transportation of the solid silicon, where purity is a strict requirement.

There are many processes now in development for making high purity silicon more economically than the above process. Examples are the high-temperature reduction of silicon tetrachloride by sodium, or by zinc, or other reductant; and another example is the thermal decomposition of silane. All of these processes yield solid silicon. It is this formation of solid silicon that has caused many problems with clogging of apparatus and decreased thermal performances in the production of silicon.

It would be desirable to provide a thermal reactor which prevents or reduces almost entirely the problems encountered by solid silicon within the thermal reactor. It would be desirable to avoid the problems of transport and handling of solid silicon and the cost of re-melt. It would be desirable to provide a small thermal reactor unit which would produce a pure liquid silicon and which would be capable of portable operation. Such a portable thermal reactor could be placed, in required numbers, in the production area of ingot or ribbon growth for supplying pure liquid silicon routinely or at any time as required.

These goals of producing inexpensive, pure silicon by thermal decomposition can be obtained with a thermal reactor in which heat and the reactant silane are supplied in sufficient amount and in proper manner to provide the following overall reaction:

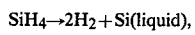

$SiH_4 \rightarrow 2H_2 + Si(liquid)$, to yield liquid silicon.

SUMMARY OF THE INVENTION

A novel and improved process has been developed in accordance with the invention for directly converting silane gas into molten silicon. The process operates efficiently and economically to produce a very high purity silicon product. The apparatus is simple and compact and can be rendered portable. The continuous low volume output can be utilized to replenish the molten silicon both in a process for continuously producing pulled ribbon or rod or in a Czochralski process.

The process of the invention includes a spiral flow reactor in which the precursor gas such as silane gas flows in an outer, forwardly moving vortex and the byproduct gas such as hydrogen flows in an inner, rearwardly moving vortex. Deposition efficiency and purity are increased due to the centrifugal actions of the outer vortex depositing molten silicon on the wall of the reactor vessel which forms a body of liquid silicon which will move forwardly to an outlet. The walls of the vessel are maintained at a temperature above the melting point of silicon. Other features of the invention relate to the configuration of the silane probe to provide a vortex motion to the gas and the cooling of the probe to further avoid premature formation and deposition of silicon liquid or solid.

The thermal reactor for thermally decomposing silane gas into liquid silicon product and hydrogen byproduct gas includes walls defining a reaction chamber. Means are provided for maintaining the reaction chamber at a temperature well above the decomposition temperature of the precursor gas. The precursor gas is preferably introduced into the reaction chamber through a water-cooled probe which maintains the temperature of the precursor gas well below its decomposition temperature to prevent clogging of the inlet by solid formation.

Tangential orientation of the injector probe produces a first outer forwardly moving vortex of liquid product and a second, inner rearwardly moving vortex of byproduct gas. The outer vortex of pure liquid product deposits on the inner surfaces of the thermal reactor walls by centrifugal force and flows to a collection zone where means are provided for removing the liquid product. The inner vortex of by-product gas is removed by an appropriately positioned outlet means.

A more complete understanding of the thermal reactor of the present invention, as well as a recognition of additional features and advantages therefor, will be afforded to those skilled in the art from a consideration of the following detailed description and exemplary embodiments thereof. Reference will be made to the appended sheets of drawings which will first be discussed briefly.

DETAILED DESCRIPTION OF THE PREFERRED EXEMPLARY EMBODIMENTS

Figure 1:
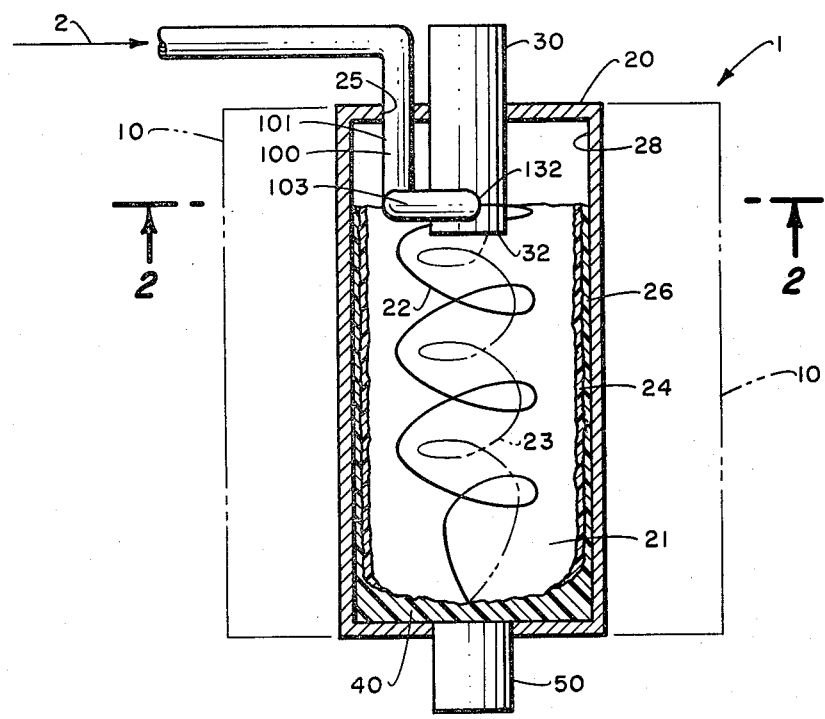
FIG. 1 is a simplified block diagram of a preferred embodiment of the present invention.
Figure 2:
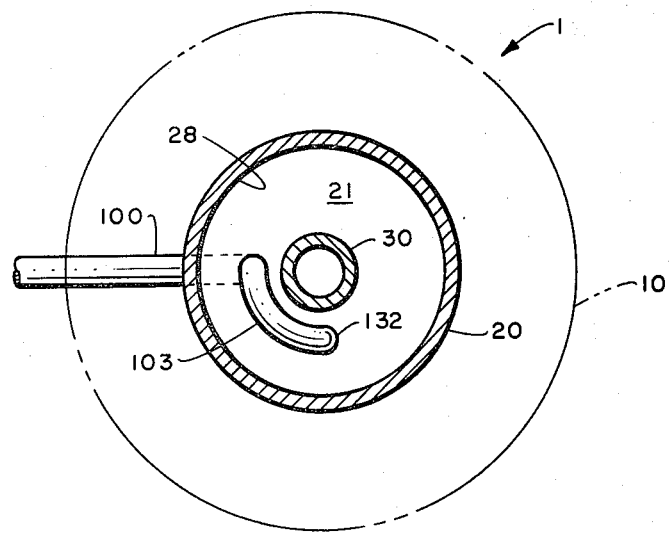
FIG. 2 is cross section view taken along line 2—2 of FIG. 1.

Referring first to FIGS. 1 and 2, the preferred exemplary embodiments of the present invention is the thermal reactor shown generally at 1. The thermal reactor 1 has a cylindrical reaction chamber 21 enclosed within walls 20 which may be formed from a high temperature resistant material such as carbon or quartz. The preferred exemplary embodiment of the present invention utilizes a high density carbon tube impermeable to gases manufactured by Carborundum Company and known as the Graph-I-Tite G90 tube. The inner surface of the high density carbon tube may be coated with a refractory material such as silicon nitride or silicon carbide. In any event, the interior wall of the high density carbon tube must be free from impurities. The reactor is operated at temperatures between 1450° and 2000° C. with the preferable range being between 1450° and 1600° C.

Means for heating the reaction chamber 21 are provided by heater 10. The heater may be of any conventional design capable of heating the reaction chamber 21 to desired temperatures, such as an induction type heater. The preferred heater of the present invention is a 5 to 10 kilowatt graphite resistance heater.

Injector means for vortically introducing a precursor gas into the reaction chamber are provided by injector probe 100. Silane is an exemplary precursor gas to be utilized in the present invention, however, other precursor gases may be thermally reacted within the reactor of the present invention. Such gases include trichlorosilane, dichlorosilane and tribromosilane. The injector probe 100 is sealingly inserted into the reaction chamber at its point of entry 25 into the reaction chamber. Also, referring to FIG. 2, the injector probe is preferably disposed oriented so that the injector orifice 132 is located above or rearward of the inlet to the vortex finder inlet 32. The injector probe 100 is also oriented such that the terminal portion 101 contains a curved portion 103 concentric with the cylindrical wall 20 to introduce the silane gas into the reaction chamber to form a first outer forward or downward moving vortex which contains the silane precursor gas and liquid silicon. A detailed description of the injector probe will be made later. When the reactor is first started up, the first outer forward or downward moving vortex containing silane gas and liquid product deposits a skull-layer 26 of silicon on the interior surface 28 of the reaction chamber 21. The skull-layer 26 insures that any silicon collected subsequent to its formation will be extremely pure. During operation, the outer forwardly or downward moving vortex 22 created by the injector probe 100 in effect continually deposits liquid silicon product on the skull-layer 26 to form a product layer 24 which forms a laminar surface which continually flows down the skull layer 26 of the reaction chamber 21 to form a pool 40 of pure silicon at the bottom or forward end of the reaction chamber 21. The pure liquid silicon 40 is removed from the reaction chamber through product removal duct 50. Although, in the preferred exemplary embodiment of the present invention the thermal reactor is shown oriented vertically, the reactor 1 may also be operated when not oriented vertically.

The thermal reactor 1 of the present invention is operated as a cyclone type reactor. The cyclone-type operation is produced by the injector probe 100 introducing the silane gas in such a manner to form the first outer, forwardly or downward moving vortex 22 which deposits the liquid product silicon onto the reactor interior walls 28. Accordingly, the cyclone operation of the thermal reactor of the present invention produces a second inner, rearward or upward moving vortex 23 which contains the by-product gas. In the preferred embodiment of the present invention the byproduct gas is hydrogen which is the result of the thermal decomposition of silane gas as previously described.

A first means for removing the liquid silicon product 40 from the reaction chamber 21 is provided by the product removal duct 50 which is associated with the forward or bottom end of the reaction chamber 21. Although, the preferred exemplary embodiment of the present invention utilizes a product removal duct 50, any convenient valving and removal means can be utilized. A crucible or other container which provides for the removal of the liquid silicon product without affecting the thermal operation of the reactor 1 may be used.

A second means for removing the hydrogen byproduct gas from the reaction chamber 21 is provided by the vortex finder 30 located at the rearward end or top end of the reaction chamber 21. The vortex finder 30 as used herein is of the type commonly utilized in the field of cyclone separation technology which are vaccum or otherwise operated at pressures below those in the reaction chamber 21 to suck the vortex gases from the chamber 21. The vortex finder should be centrally located so that it is in communication with the rearwardly or upwardly moving second inner vortex 23. The vortex finder 30 is preferably located so that the inlet 32 of the vortex finder 30 is located below or forward of the injector probe orifice 132. Having thus described the general operation of the thermal reactor 1 of the present invention, a more detailed discussion follows with regard to the structure of a cooled injector probe 100 and specific operating parameters with respect to the production of liquid silicon.

Figure 3:
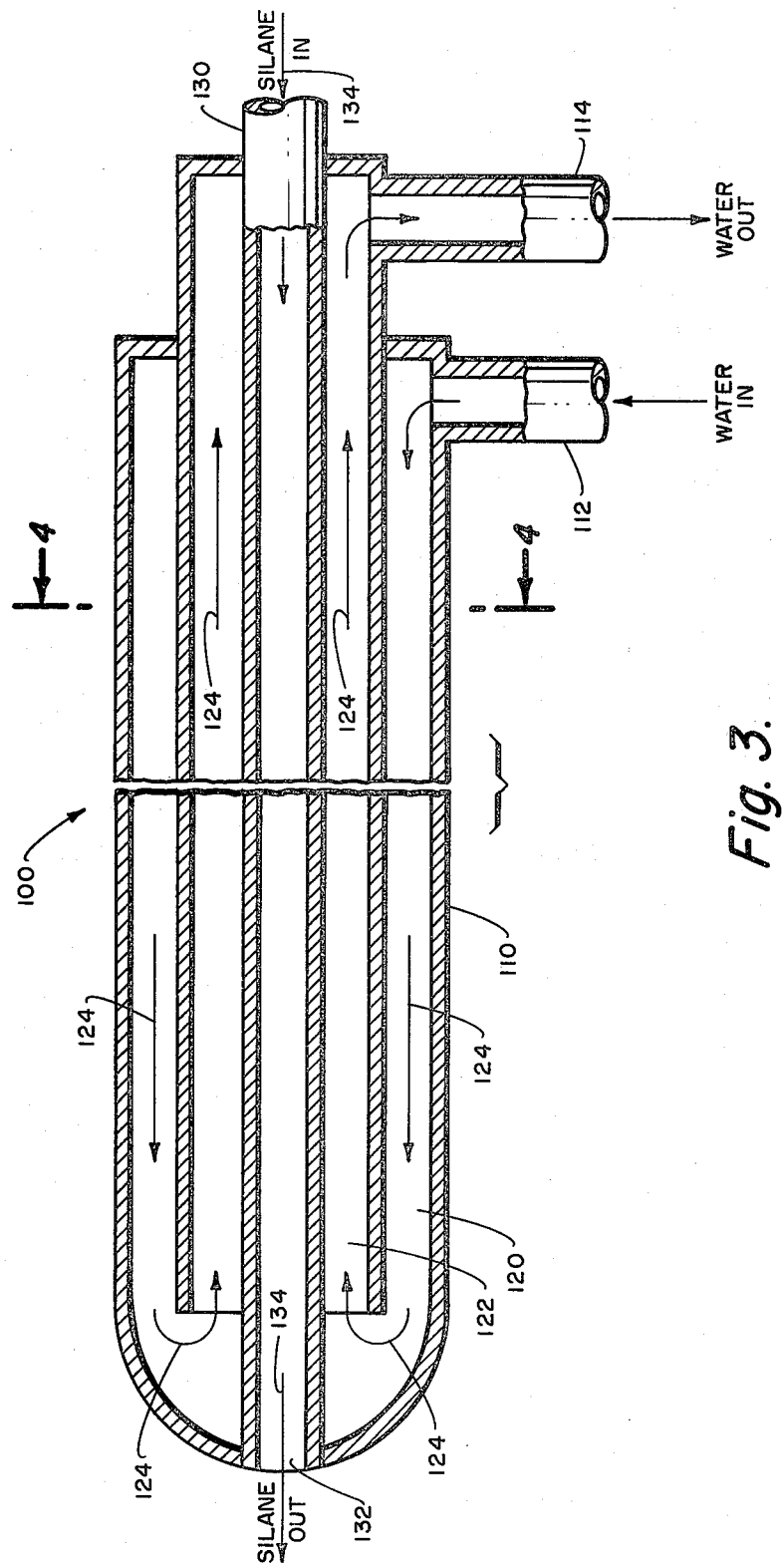
FIG. 3 is a detailed cross-sectional view of the water-cooled injector probe of the present invention.
Figure 4:
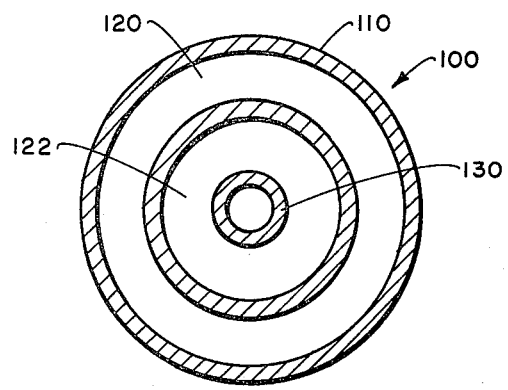
FIG. 4 is a detailed cross-sectional view of the injector probe taken along the line 4—4 of FIG. 3.

Referring now to FIGS. 3 and 4, the cooled injector probe 100 can be formed of metal, glass or other inert material and is illustrated in a straight configuration before being bent into the form shown in FIGS. 1 and 2. The cooled injector probe 100 is operated under conditions which maintain the temperature of the precursor silane gas 2 at temperatures well below the decomposition temperature of silane prior to the introduction of the silane gas into the reaction chamber 21. This avoids the problems experienced by prior art workers involving clogging of the inlet line. The injector probe is provided with an injector tube 130 which has an internal diameter of about six-hundreths of an inch. The injector tube may be constructed of metal or glass materials which will not introduce any impurities into the silane precursor gas as it passes through the injector tube 130 as shown by arrows 134. Stainless steel is preferred. The injector tube 130 terminates at an orifice 132 for allowing passage of the silane gas into the reaction chamber 21.

Cooling means are provided for maintaining the temperature of the injector tube 130 at temperatures well below the decomposition temperature of silane which is approximately 400° C. The preferred cooling means comprises a concentric cooling passage adjacent to the wall of the precursor gas tube through which a flow of heat exchange fluid such as water is maintained. In the preferred exemplary embodiment of the present invention the injector tube 130 is constructed of stainless steel and the cooling means are also constructed of stainless steel. The cooling means comprises a stainless steel cooling jacket 110 which surrounds the injector tube 130. The cooling jacket 110 is comprised of a water inlet 112, a water outlet 114, an outer flow zone 120 and a injector tube contact passage 122. Water is continually supplied to the cooling jacket 110 through the water inlet 112 and flows through the outer flow zone 120 and injector tube contact zone 22 as shown by arrows 124. The entire injector probe 100 containing the injector tube 130 with the cooling jacket 110 is fabricated from stainless steel tubing which is welded together to form the injector probe depicted in FIG. 2 by conventional methods well known in the art.

The configuration of injector probe 100 may be varied from that shown. However, a metal probe may be conveniently bent so that when it is within the reaction chamber 21 the outer orifice is above or rearward of the vortex finger inlet 32 and is in a plane normal to the axis of the outer and inner vortexes 22, 23. This results in introduction of the silane gas into the reaction chamber 21 tangentially to the interior surface 28.

In the preferred exemplary embodiment of the present invention, the silane gas is introduced through the injector tube 130 at a flow rate of 3 liters per minute STP. The silane gas within the injector tube 130 is maintained at temperatures very close to the temperature of the water that is introduced for cooling purposes. The temperature of the reaction zone 21 is maintained optimally between 1450° and 1600° C. In this temperature range, conversion of silane into liquid silicon is extremely rapid which greatly minimizes the formation of solid silicon which would deleteriously affect the operation of the thermal decomposition reactor 1.

Figure 5:
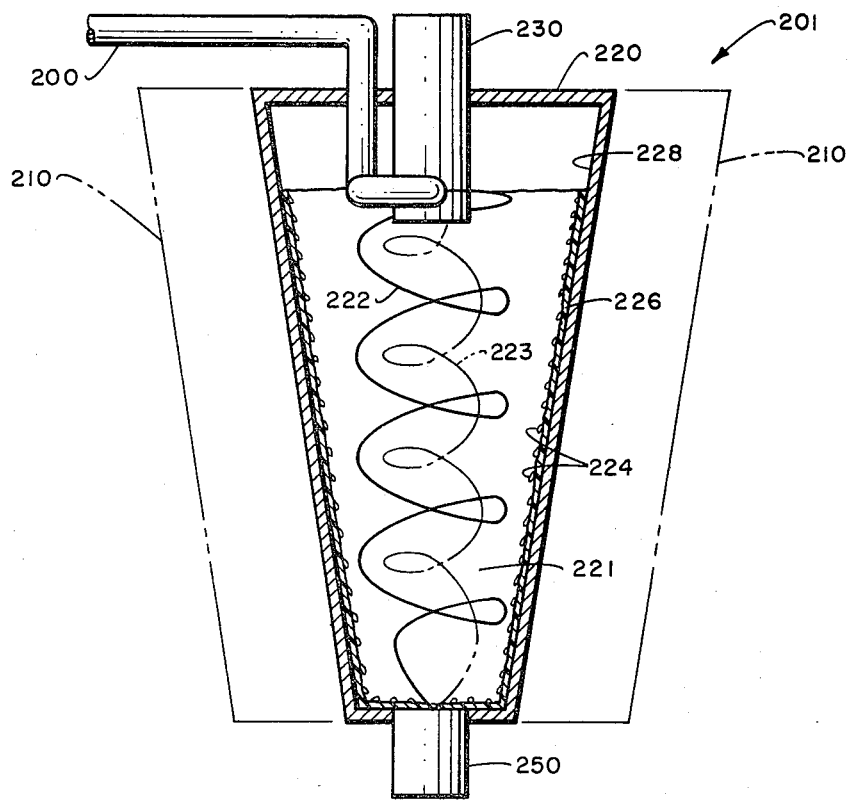
FIG. 5 is a simplified block diagram of a second preferred exemplary embodiment of the present invention.

An alternative exemplary embodiment of the present invention is shown in FIG. 5. In this particular embodiment the reaction vessel 220 is frusto-conical in shape. The interior surfaces 228 converge as they move from the rear or top end to the forward or bottom end of the reaction vessel 220.

In one version of the reactor the interior reactor walls 228 are coated with a substance which causes the liquid silicon to form discrete beads. An alkaline halide is an exemplary coating capable of providing the desired effect. Sodium fluoride or lithium fluoride are preferred coatings. The silicon liquid product beads 224 flow down the lithium or sodium halide surface 226 to be collected and removed at the bottom or forward end of the reactor by means of a liquid silicon product removal duct 250. It should be noted that the first preferred exemplary embodiment of the present invention may also be constructed having a bead forming surface such as surface 226 simply by coating the interior of the preferred reaction chamber walls 20 with the appropriate coating such as lithium fluoride or sodium fluoride. The operation of the alternative exemplary embodiment 201 functions the same as the first preferred exemplary embodiment 1 except for the beading of the liquid silicon product.

The thermal reactor 201 is similarly provided with a heater 210 and a vortex finder 230 for removing the hydrogen by-product gas of the second inner, upwardly or rearwardly moving vortex. The water-cooled injector probe 200 may be the same as that utilized in the first preferred exemplary embodiment and also similar means may be utilized for removing the liquid product resulting from the outward, downward or forwardly moving vortex 222 carrying the liquid silicon product. This means is provided by the liquid product removal conduit 250. The alternative exemplary embodiment, with its frusto-conical shape, is produced in keeping with cyclone separator technology wherein the usual configuration is a cone. This configuration may enhance the cyclonic effect and create more efficient deposition of liquid product from the outer vortex onto the reactor walls 228.

The overall dimensions of either exemplary embodiment of the present invention may be kept small enough so that the reactor 1 or 201 may easily be handled and transported to various locations. At this size, it may readily and appropriately be operated, or be fed by pressurized bottles of silane. All that is required at the given location is a K-bottle of precursor gas such as silane and a coolant such as water under pressure for providing water circulation through the cooling jacket and additionally, a 110 V or 220 V outlet of energy for providing heat for the heater and means must be provided for collecting or venting the hydrogen that exits the reactor. This portability provides an improvement over prior art methods which require the large scale production of solid silicon which is then transported to the location where the solid is remelted and formed for final use. Furthermore, storage and handling increase the possibility of contamination. The apparatus and method of the present invention prevents the necessity for transport and handling of solid silicon. It allows an inexpensive, rapid and portable method for producing liquid silicon at the place of conversion of liquid to ingot or ribbon product.

Other forms of apparatus and of operating the apparatus may be practiced such as the use of different heat exchange fluids, different configurations of inlet probes, vortex finders or continuous removal of liquid product to feed a molten production bath. Other alternatives are to enter or attach the silicon injector directly into the liquid silicon including bubbling the silane therethrough so that the nascent silicon is captured before entering the interior of the reactor.

It is to be realized that only exemplary and preferred embodiments of the invention have been described and that these and many other alternatives, variations, adaptations and modifications are permissible without departing from the spirit and scope of the invention as defined in the following claims.

We claim:

1. A thermal reactor apparatus for pyrolytically decomposing a precursor gas containing a single decomposable compound into a liquid product and a by-product gas comprising:
   a reactor having walls defining a reaction chamber;
   means for heating said reaction chamber to a temperature above the melting point of said liquid product and for heating chamber to a temperature above the decomposition temperature of the precursor gas;
   injector means disposed within the interior of said reaction chamber for vortically introducing said precursor gas into said reaction chamber to form a first outer, forwardly moving vortex containing said precursor gas and said liquid product and a second inner, rearwardly moving vortex containing said by-product gas;
   cooling means for cooling said injector portion within the interior of said chamber to a temperature substantially below the decomposition temperature of the precursor gas;

first means associated with the forward end of said reaction chamber for removing said liquid product from said reaction chamber; and second means associated with the rearward end of said reaction chamber in communication with said second vortex for removing by-product gas from said reaction chamber.

2. The thermal reactor of claim 1 wherein said jacket for cooling said injector extends along the entire length of the portion of said injector disposed within said reaction chamber.

3. The thermal reactor of claim 1 wherein said injector means introduces said precursor gas into a hot zone within said reaction chamber which is maintained at a temperature at least 300° C. above the decomposition temperature of said precursor gas.

4. The thermal reactor of claim 1 wherein said injector means includes a terminal orifice disposed in a plane normal to the axis of the first and second vortexes to introduce said precursor gas tangentially into said reaction chamber.

5. The thermal reactor apparatus of claim 1 wherein said second means for removing by-product gas comprises a vortex finder extending into said reaction chamber.

6. The thermal reactor apparatus of claim 5 wherein the terminal orifice of said injector means is disposed rearward of the inlet to said vortex finder.

7. The thermal reactor apparatus of claim 1 wherein said cooling means comprises a jacket for said injector for receiving a continuous flow of heat exchange fluid.

8. The thermal reactor of claim 1 wherein said heating means includes a tubular heater surrounding said reaction chamber extending from the forward end to the rearward end of said reaction chamber.

9. The thermal reactor of claim 1 wherein said reactor walls include an interior surface defining a flow path to said first means for removing said liquid product.

10. The thermal reactor of claim 9 wherein the interior surface of said reactor walls are readily wetted by said liquid product to provide a continuous film of liquid product along said flow path.

11. The thermal reactor of claim 9 wherein the interior surface of said reactor walls contains a coating whereby discrete beads of liquid product flow along said flow path.

12. The thermal reactor of claim 10 wherein said reactor walls have an inner coating composed of a substance selected from the group consisting of carbon, silicon carbide and silicon nitride.

13. The thermal reactor of claim 11 wherein said reactor walls have an inner layer of an alkaline metal fluoride.

14. The thermal reactor of claim 1 wherein said reactor walls have a circular cross section.

* * * * *